United States Patent
Goodwin, III

[19]

[11] Patent Number: 6,047,263
[45] Date of Patent: Apr. 4, 2000

[54] METHOD OF DISPLAYING INFORMATION BY AN ELECTRONIC PRICE LABEL

[75] Inventor: John C. Goodwin, III, Suwanee, Ga.

[73] Assignee: NCR Corporation, Dayton, Ohio

[21] Appl. No.: 09/205,740

[22] Filed: Dec. 4, 1998

[51] Int. Cl.[7] .......................... G06F 17/60; G06K 15/00
[52] U.S. Cl. .................. 705/20; 705/1; 705/14; 705/16; 705/20; 705/21; 705/400; 705/409; 705/410; 705/411; 705/26; 235/382; 235/383; 235/385; 235/375; 235/472.01; 340/825.55; 340/10.2; 340/825.35; 345/192; 345/193; 345/513; 345/520; 345/197
[58] Field of Search ................... 705/20, 14, 21, 705/16, 400, 409, 410, 411; 235/382, 383, 385, 375; 340/825.55; 345/192, 193, 197, 513, 520

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 5,172,314 | 12/1992 | Poland et al. | 364/401 |
| 5,348,485 | 9/1994 | Briechle et al. | 705/26 |
| 5,374,815 | 12/1994 | Waterhouse et al. | 235/383 |
| 5,406,035 | 4/1995 | Wallisch | 705/23 |
| 5,448,226 | 9/1995 | Failing, Jr. et al. | 340/825.35 |
| 5,532,465 | 7/1996 | Waterhouse et al. | 235/383 |
| 5,548,282 | 8/1996 | Escritt et al. | 340/825.35 |
| 5,619,416 | 4/1997 | Kosarew | 700/225 |
| 5,704,049 | 12/1997 | Briechle | 345/326 |
| 5,753,900 | 5/1998 | Goodwin, III et al. | 235/383 |
| 5,758,064 | 5/1998 | Zimmerman et al. | 340/10.2 |
| 5,854,475 | 12/1998 | Goodwin III | 235/383 |
| 5,898,383 | 4/1999 | Forsythe | 340/825.35 |
| 5,914,670 | 6/1999 | Goodwin, III et al. | 340/825.52 |
| 5,943,654 | 8/1999 | Goodwin, III et al. | 705/14 |
| 5,977,998 | 11/1999 | Briechle et al. | 345/520 |

*Primary Examiner*—James P. Trammell
*Assistant Examiner*—Nga B. Nguyen
*Attorney, Agent, or Firm*—Paul W. Martin

[57] ABSTRACT

A method of displaying information associated with a special promotion by an electronic price label (EPL) which saves bandwidth at a start time of the special promotion. The method includes the steps of receiving a number of first messages containing the second information by the EPL prior to the special promotion, storing the second information in a second memory location within the EPL while the first information is being stored within a first memory location in the EPL by the EPL prior to the special promotion, receiving a second message containing a command to display the second information by the EPL at about the time of the special promotion, reading the second information from the second memory location by the EPL, and displaying the second information by the EPL.

5 Claims, 4 Drawing Sheets

METHOD OF DISPLAYING INFORMATION BY AN ELECTRONIC PRICE LABEL

CROSS REFERENCE TO RELATED APPLICATION

The present invention is related to the following commonly assigned and co-pending U.S. application:

"Method of Displaying Temporary Information By An Electronic Price Label", filed Dec. 4, 1998, invented by Goodwin, and having a Ser. No. 09/205,739.

BACKGROUND OF THE INVENTION

The present invention relates to electronic price label (EPL) systems, and more specifically to a method of displaying information by an EPL.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs typically include a memory for storing operating information, display data, and instructions. This memory typically includes a plurality of data registers. A typical EPL with an eight-character liquid crystal display requires one data register for storing display data. This information may include price information and promotional information.

In order to display data using an EPL, a message containing the information must be sent to the EPL. Each time the information changes, a message must be sent to the EPL containing new information to be displayed. For example, suppose that an EPL is assigned a promotional message "withcard / save 0.40". Currently, four messages in series are required to send this promotional message to the EPL. The four messages require about sixteen seconds if each of the four messages is successfully received by the EPL on the first attempt. Typically, thirty-two seconds are required if the success rate is only fifty percent. An operator must determine whether the four messages have been received before proceeding. After the EPL acknowledges successful receipt, the EPL system must send an additional message to activate display of the promotional message. Sending the promotional message before it's scheduled display time would minimize bandwidth usage at activation time.

Therefore, in order to conserve EPL system's communication bandwidth, it would be desirable to provide a method of displaying information by an EPL which avoids having to send new display data to the EPL at a time at which a change occurs.

SUMMARY OF THE INVENTION

In accordance with the teachings of the present invention, a method of displaying information by an EPL is provided.

The method includes the steps of receiving a number of first messages containing the second information by the EPL prior to the special promotion, storing the second information in a second memory location within the EPL while the first information is being stored within a first memory location in the EPL by the EPL prior to the special promotion, receiving a second message containing a command to display the second information by the EPL at about the time of the special promotion, reading the second information from the second memory location by the EPL, and displaying the second information by the EPL.

It is accordingly an object of the present invention to provide a method of displaying information by an EPL.

It is another object of the present invention to provide a method of displaying information by an EPL which avoids having to send information to an EPL each time a change in displayed information occurs.

It is another object of the present invention to provide a method of displaying information by an EPL which stores a plurality of different display possibilities in the EPL.

It is another object of the present invention to conserve EPL system communication bandwidth.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
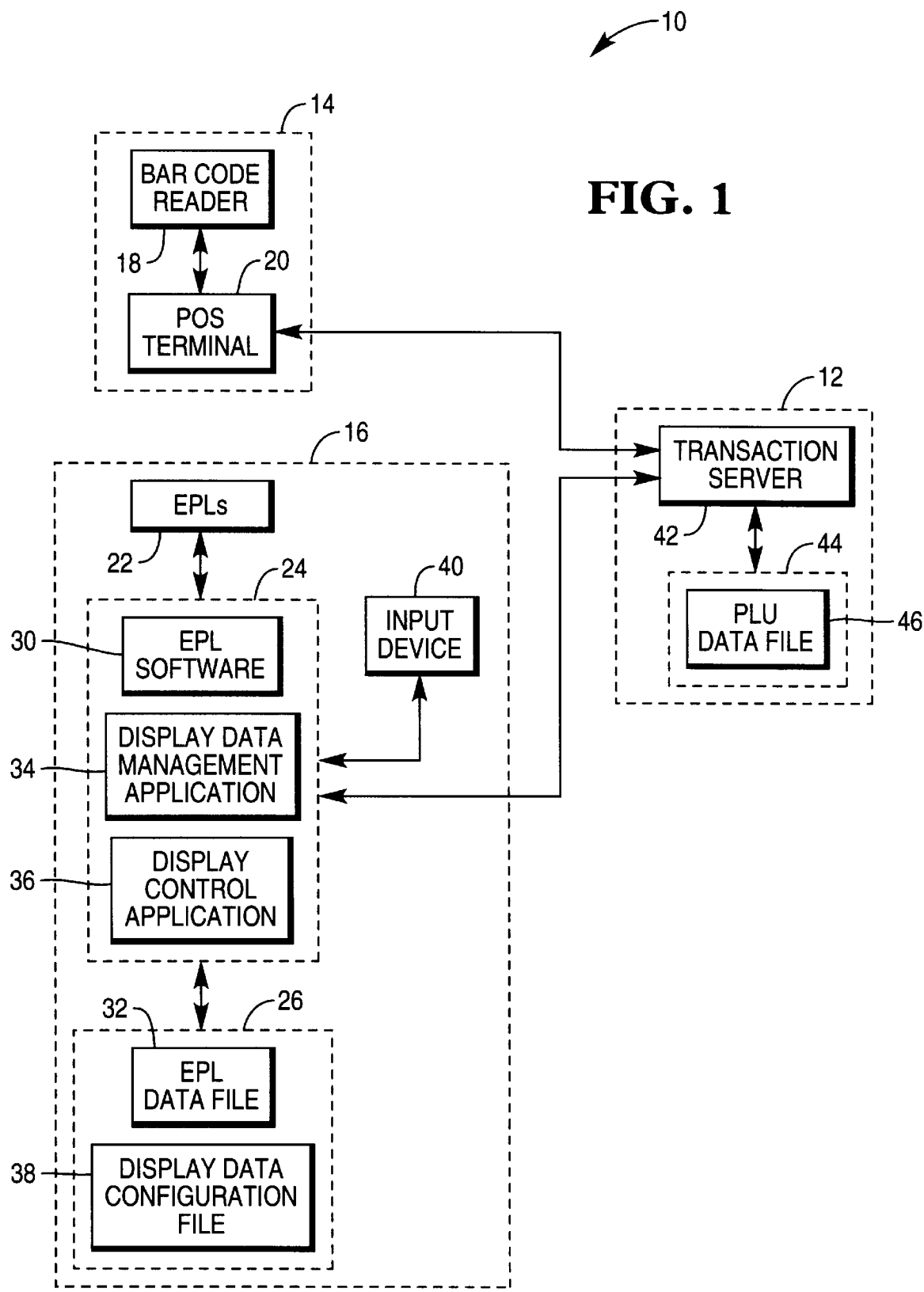
FIG. 1 is a block diagram of a transaction processing system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code reader 18 and terminal 20.

EPL system 16 primarily includes EPLs 22, host EPL computer 24, and EPL storage medium 26.

Host EPL computer 24 executes EPL software 30. To assist with execution of certain tasks performed by EPL software 30, EPL computer 24 includes a built-in time keeping device, commonly referred to as a system clock, which is synchronized with current time, in order to automatically execute the tasks at their scheduled times.

EPL software 30 is responsible for scheduling and transmitting price data from EPL data file 32 to EPLs 22. EPL software 30 obtains prices in PLU data file 46 as they are entered in input device 40 (immediate processing) or after they have been stored within price look-up (PLU) data file 46.

EPL computer 24 also executes EPL display data management application 34 and EPL display control application 36.

EPL display data management application 34 stores display data in display data configuration file 38 and preloads the display data into one or more EPLs prior to such data being needed for display by the EPLs. The display data may be event-specific. For example, one type of display data may be associated with a special promotion of the items assigned to the EPLs. EPL display data management application 34 pre-loads the display data in the EPLs so that it is ready to be displayed by the EPLs before the special promotion occurs. Thus, the display data is always ready for display.

EPL display control application 36 records operator-entered choices for EPL display modes. EPL display control application 36 reads display data configuration file 38 in order to present mode choices to the operator. EPL display control application 36 creates messages for activating the display modes using the information in display data configuration file 38 and passes the messages to EPL software 30 for scheduling and transmission.

For example, EPL display data management application 34 may pre-load display data, including the following three promotional messages, "new item", "low fat item", and "savings of 0.25", into EPL 22 prior to such data being needed for display by EPL 22. EPL display control application 36 activates one of the three promotional messages in response to a mode choice in display data configuration file 38. Advantageously, activation requires minimal bandwidth since only a command is sent.

EPL storage medium 26 stores EPL data file 32 and display data configuration file 38. EPL storage medium 26 and is preferably a fixed disk drive.

EPL data file 32 contains EPL identification and price checksum information. Price checksum information is calculated from price information in PLU data file 46. EPL data file 32 contains current information displayed by EPLs 22.

Display data configuration file 38 includes a table of display modes and corresponding EPL data registers containing data to be displayed during activation of the modes. EPL display data management application 34 manages this table. In order to activate a mode, EPL display control application 36 obtains EPL data registers from display data configuration file 38 and sends a command to an EPL to display the contents of the data registers.

The contents of EPL data file 32 and display data configuration file 38 may be placed in any number of files instead of two files.

Input device 40 is preferably a keyboard.

Host computer system 12 includes PLU storage medium 44 and transaction server 42.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Figure 2:
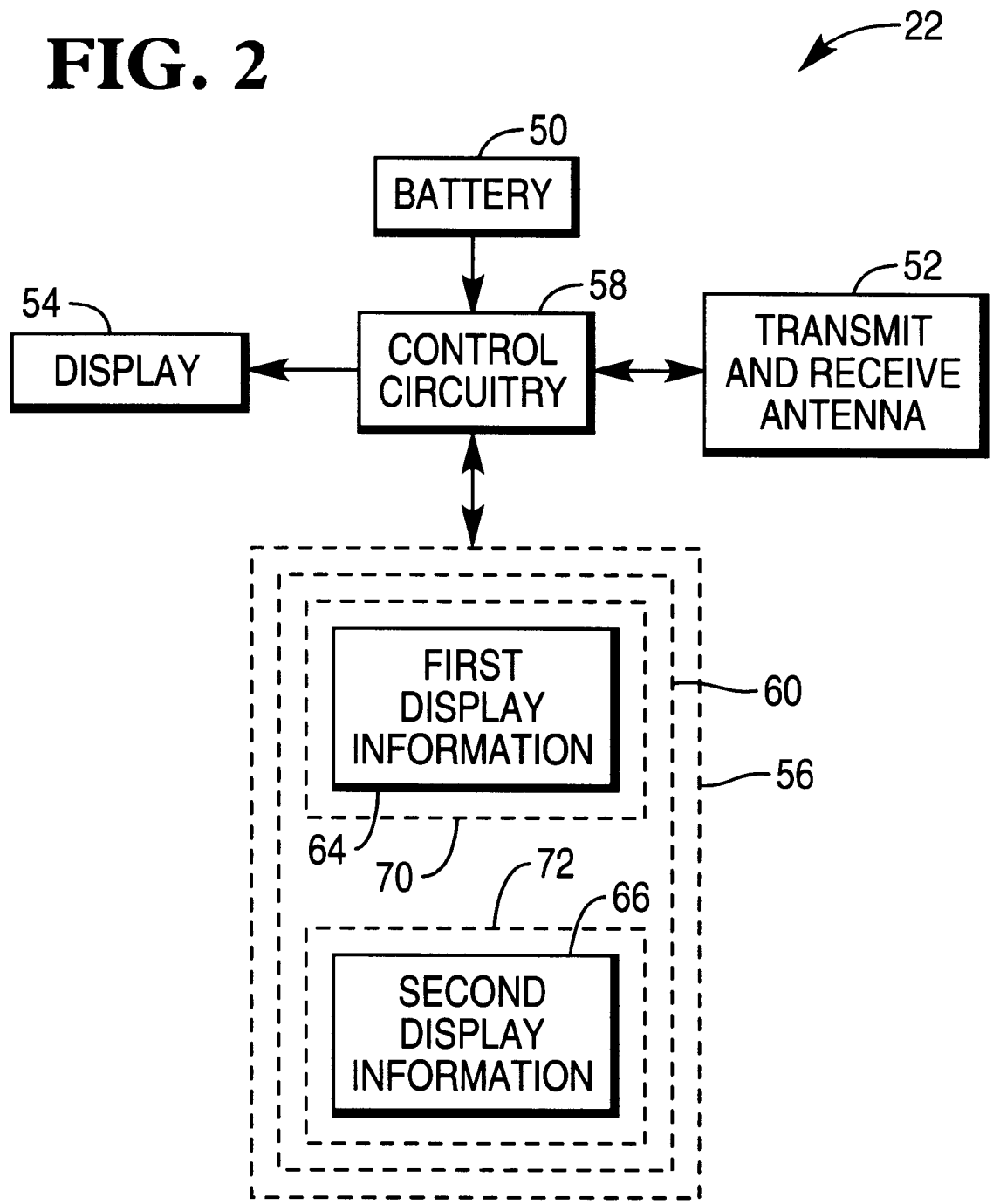
FIG. 2 is a block diagram of an EPL.

Turning now to FIG. 2, EPLs 22 each include battery 50, transmit and receive antenna 52, display 54, memory 56, and control circuitry 58.

Battery 50 provides power to each EPL 22.

Transmit and receive antenna 52 receives and transmits messages to EPL computer 24.

Display 54 displays price and possibly additional information, such as promotional information. Display 54 is preferably a liquid crystal display (LCD).

Memory 56 includes groups 70–72 of data registers 60. Although two groups are shown, additional groups may also be included. Group 70 stores first display information 64 and group 72 stores second display information 66. Each group preferably includes at least one data register 60.

For example, in an EPL 22 having four data registers, one data register may be added to store secondary display information 66.

As another example, in an EPL 22 having eight data registers, four data registers may be allocated to store additional groups of display information.

EPL circuitry 58 controls the internal operation of EPLs 22 and includes transceiver circuitry for communicating with EPL computer 24.

In particular, EPL circuitry 58 executes instructions from EPL computer 24 which designate information to be displayed. For example, one such instruction is an instruction from EPL display control application 36 to display the contents of certain registers.

Figure 3:
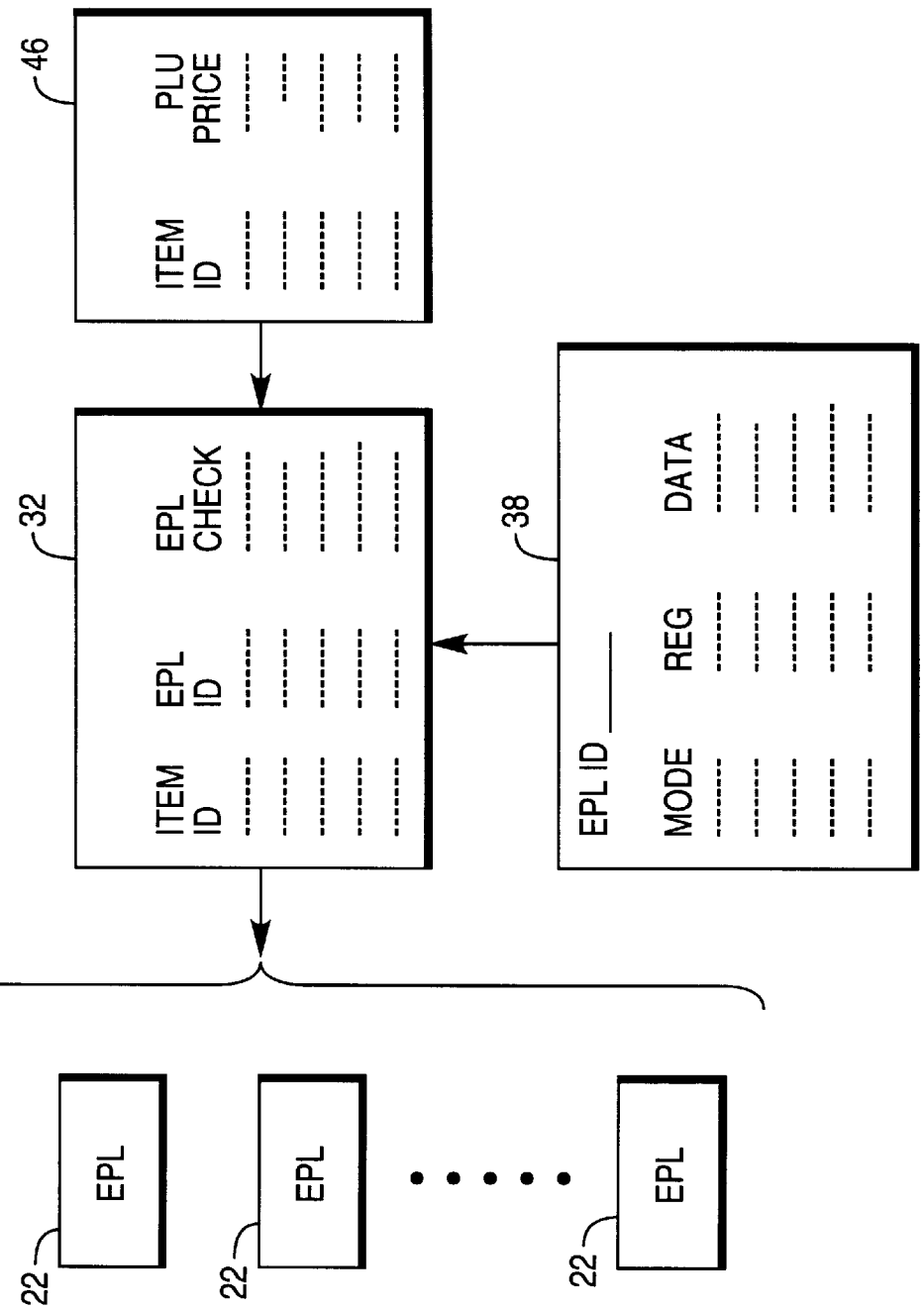
FIG. 3 is a diagram showing data files used within a transaction establishment.

Turning now to FIG. 3, EPL data file 32, display data configuration file 38, and PLU data file 46 are shown in more detail.

EPL data file 32 includes a line entry for each EPL 22 in EPL system 16. Each line entry has an item identification entry (ITEM ID), an EPL identification entry (EPL ID), and an EPL price checksum value entry (EPL CHECK).

Entry ITEM ID identifies a store item. Entry EPL ID identifies which EPL is assigned to the item. Entry EPL CHECK is a checksum value of the digits of the price information that is displayed by display 56.

Display data configuration file 38 includes a separate record for each EPL ID. Each record contains a list of display modes (MODE), corresponding registers (REG), and register contents (DATA).

PLU data file 46 includes a line entry for each item sold in the transaction establishment. Each line entry has at least an item identification entry (ITEM ID) and a PLU price entry (PLU PRICE).

During normal operation, EPL computer pre-loads display data into an EPL and later activates it. EPL display data management application 34 records operator-entered mode choices and corresponding display data for an EPL and stores the operator mode choices and display data in display data configuration file 38. EPL computer 24 sends a message containing the display data. Control circuitry 58 receives the message from EPL computer 24 and stores the display data in data registers 60.

To activate display data, EPL display control application 36 records an operator mode choice and reads configuration file 38 to obtain the corresponding register 60. EPL computer 24 sends a second message to the EPL with an instruction to display the contents of the register 60. EPL display control application 36 may process individual display changes or create batches of changes.

Figure 4:
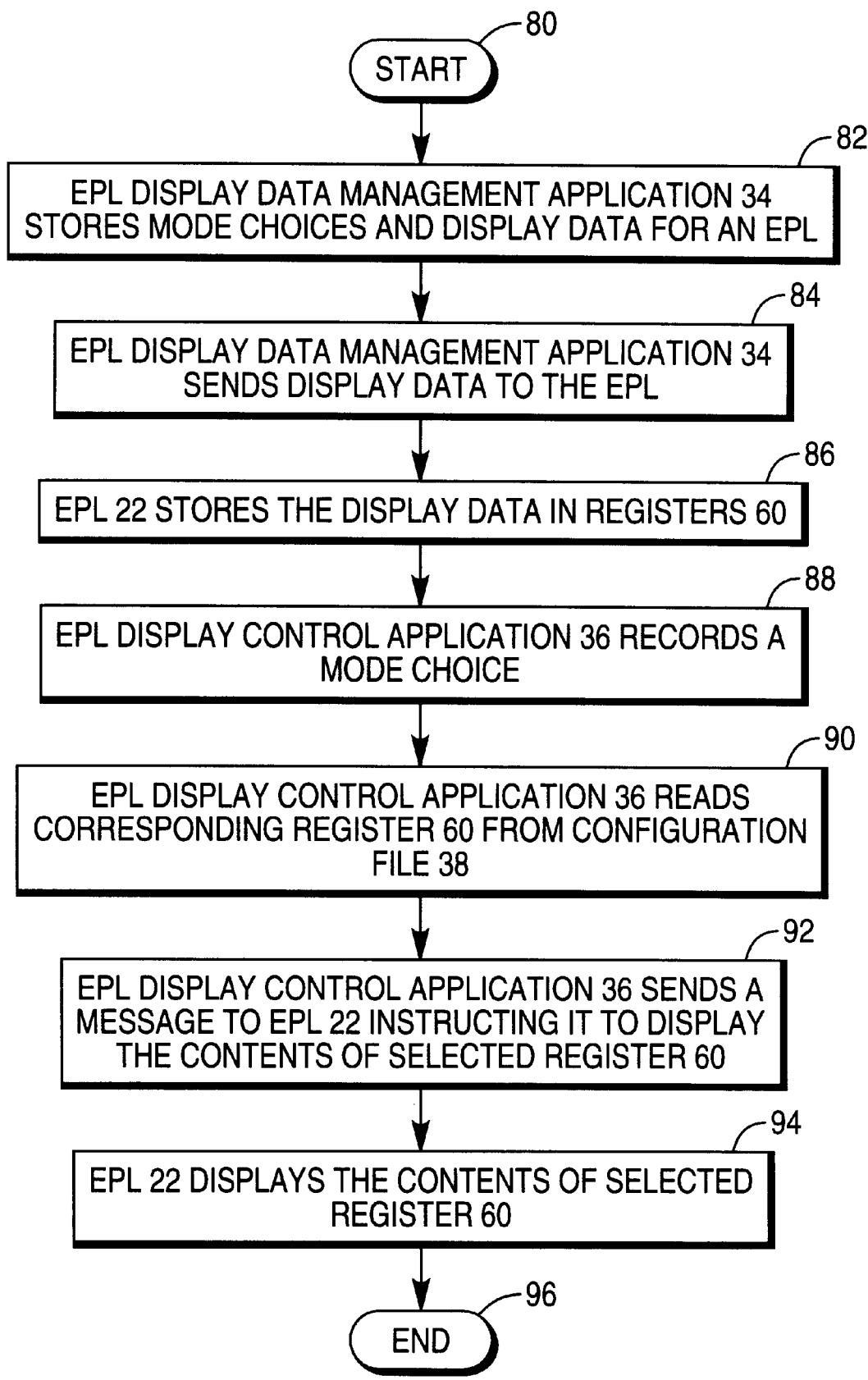
FIG. 4 is a flow diagram illustrating a method of displaying data.

Turning now to FIG. 4, the display method is illustrated in more detail beginning with START 80.

In step 82, EPL display data management application 34 records operator-entered mode choices and corresponding display data for an EPL and stores the operator mode choices and display data in display data configuration file 38.

In step 84, EPL display data management application 34 the sends display data to the EPL through EPL control software 30.

In step 86, control circuitry 58 receives the message from EPL computer 24 and stores the display data in data registers 60.

In step 88, EPL display control application 36 records a mode choice.

In step 90, EPL display control application 36 reads configuration file 38 to obtain the corresponding register 60.

In step 92, EPL display control application 36 sends a message to the EPL with an instruction to display the contents of the selected register 60.

In step 94, control circuitry 58 displays the contents of the selected register 60.

In step 96, the method ends.

Although the present invention has been described with particular reference to certain preferred embodiments thereof, variations and modifications of the present invention can be effected within the spirit and scope of the following claims.

I claim:

1. A method of displaying second information associated with a special promotion of a product following first information by an electronic price label (EPL) comprising the steps of:
    (a) receiving a number of first messages containing the second information by the EPL prior to the special promotion;
    (b) storing the second information in a second memory location within the EPL while the first information is being stored within a first memory location in the EPL by the EPL prior to the special promotion;
    (c) receiving a second message containing a command to display the second information by the EPL at about the time of the special promotion;
    (d) reading the second information from the second memory location by the EPL; and
    (e) displaying the second information by the EPL.

2. A method of displaying second information in connection with a special promotion of a product following first information by an electronic price label (EPL) comprising the steps of:
    (a) storing the second information in a record associated with the EPL;
    (b) sending a number of first messages to the EPL in advance of the special promotion containing the second information;
    (c) receiving the first messages by the EPL;
    (d) storing the second information in a second portion of a memory by the EPL while the first information is being stored in a first portion of the memory by the EPL prior to the special promotion;
    (e) sending a second message to the EPL at about a start time for the special promotion containing a command to display the second information;
    (f) receiving the second message by the EPL;
    (g) reading the second information from the memory by the EPL; and
    (h) displaying the second information by the EPL.

3. A method of displaying second information in connection with a special promotion of a product following first information by an electronic price label (EPL) comprising the steps of:
    (a) storing a number of types of second information in a first record associated with the EPL;
    (b) storing a memory location in the first record;
    (c) storing a type identifier in the first record for each type of second information;
    (d) recording an operator choice for one of the type identifiers;
    (e) reading the first record to obtain the second information associated with the one type identifier and the memory location;
    (f) sending a first message to the EPL in advance of the special promotion, while the EPL is displaying the first information, containing the second information for the one type identifier, and a command to store the second information for the one type identifier in the memory location; and
    (g) sending a second message to the EPL at about a scheduled start time for the special promotion containing a command to display the second information.

4. An electronic price label (EPL) system comprising:
    a computer which sends a number of first and second messages containing first and second information, and a third message containing a command to display the second information, wherein the computer sends the second messages prior to a special promotion of a product, and wherein the computer sends the third message at about a start time of the special promotion; and
    an EPL, including
        a display;
        a memory containing a first portion for storing the first information from the computer and a second portion for storing the second information from the computer; and
        a control circuit which stores the first information in the first portion and the second information in the second portion, receives the third message, reads the second information from the second portion, and displays the second information.

5. An electronic price label (EPL) comprising:
    a display;
    a memory containing a first portion for storing first information and a second portion for storing second information; and
        a control circuit which stores the first information in the first portion and the second information in the second portion, receives the third message, reads the second information from the second portion, and displays the second information.

* * * * *